United States Patent [19]

Boudreau

[11] Patent Number: 5,279,181
[45] Date of Patent: Jan. 18, 1994

[54] TRICYCLE STEERING ASSEMBLY
[75] Inventor: Robert J. Boudreau, Bedford, Pa.
[73] Assignee: Hedstrom Corporation
[21] Appl. No.: 50,502
[22] Filed: Apr. 20, 1993
[51] Int. Cl.[5] .......................... B62K 21/12; F16B 7/10
[52] U.S. Cl. .................................. 74/551.1; 280/279; 403/362; 403/104
[58] Field of Search ................. 74/551.1, 551.3, 551.8; 280/279, 278, 280; 403/109, 104, 362, 383

[56] References Cited

U.S. PATENT DOCUMENTS

| 3,955,828 | 5/1976 | Boudreau | 280/279 |
| 4,529,332 | 7/1985 | Glabiszewski | 403/362 |
| 4,624,470 | 11/1986 | Love | 280/279 |
| 4,653,745 | 3/1987 | Nakao et al. | 74/551.1 |
| 4,699,233 | 10/1987 | Koga et al. | 280/279 X |
| 4,950,003 | 8/1990 | Holtz | 403/362 |
| 5,003,839 | 4/1991 | Yang | 280/279 X |
| 5,193,930 | 3/1993 | Chi | 74/551.1 X |

FOREIGN PATENT DOCUMENTS 2397316  3/1979  France ........................... 74/551.1

Primary Examiner—Vinh T. Luong
Attorney, Agent, or Firm—Cesari and McKenna

[57] ABSTRACT

An improved steering assembly for a tricycle comprises a front fork whose tubular stem is received in a head tube and has a flat area which is engaged by an internal projection extending from the wall of the head tube toward the head tube axis so as to limit the angular excursions of the fork about that axis and thereby prevent the tricycle from tipping over due to oversteering.

4 Claims, 2 Drawing Sheets

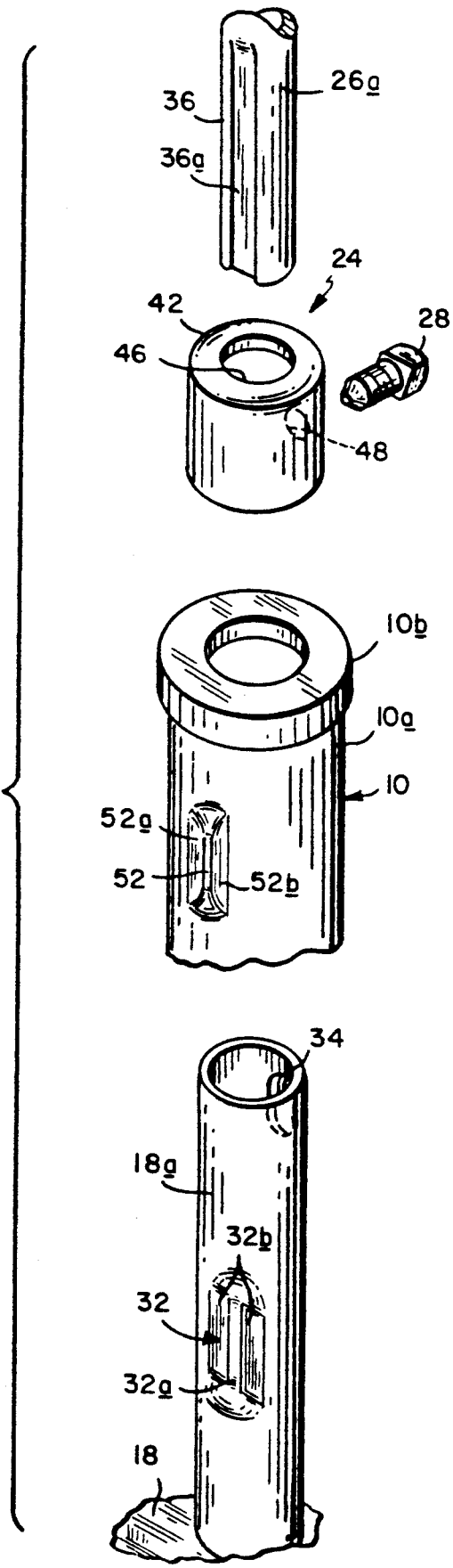

TRICYCLE STEERING ASSEMBLY

FIELD OF THE INVENTION

This invention relates to a rugged, safe steering assembly for use on tricycles. While we refer specifically to tricycles throughout this application, it should be understood that the invention described herein is equally applicable for use on certain low cost sidewalk bikes.

BACKGROUND OF THE INVENTION

Conventional children's tricycles are steered by turning handlebars attached to a front fork which supports the front wheel of the vehicle. Usually there is no provision for limiting the degree to which the front wheel can be turned. Therefore, if the tricycle is moving forwardly at a relatively high rate of speed and the front wheel is oversteered to the right or left, the forward momentum of the tricycle and its rider may cause the toy to tip over, resulting in possible injury to the rider.

Indeed, in the case of some tricycles, the front fork and handlebars may have unlimited rotary freedom so that they can actually face backwards relative to the remainder of the trike which can be confusing and annoying particularly to very young children just learning to ride.

Also, industry standards covering children's tricycles require that the tricycle steering assembly pass a rotational torque test of at least 35 lbs. This means that with the front fork held in a fixed position, a torque on the handlebars of 35 lbs. must not cause the handlebars to turn relative to the front fork; see U.S. Pat. No. 3,955,828.

It has been proposed to provide some kind of stop for limiting the rotational movements of the front fork and handlebars of tricycles. However, there has been some difficulty accomplishing this objective and still satisfying the above torque requirement while avoiding unduly increasing the overall cost of the tricycle. Some obvious solutions require the use of relatively expensive machined parts. Others necessitate the use of parts which must be spot welded or otherwise held in place prior to assembling the tricycle, thereby increasing labor costs. Still other solutions make it more difficult to assemble the front end of the tricycle. Bearing in mind that most tricycles of this type are shipped to the customer in a knocked-down condition and must be assembled by the parent in the home without any special tools or equipment, it is imperative that the construction be such that the tricycles can be put together by an unskilled person with a minimum amount of time and effort.

SUMMARY OF THE INVENTION

Accordingly, the present invention aims to provide an improved steering assembly for a tricycle which has a limited degree of rotary motion and satisfies the industry standard rotational torque requirement.

A further object of the invention is to provide a tricycle steering assembly which employs a minimum number of low-cost, stamped, tubular and sheet metal parts and thus does not add materially to the overall cost of the tricycle.

A further object of the invention is to provide a tricycle steering assembly which can be put together quickly by an unskilled person without any special tools.

Yet another object of the invention is to provide a steering assembly of this type which allows a wide range of adjustment of handlebar height without sacrificing rotational torque strength.

In general, the steering assembly employs a front fork whose tubular stem is provided with an internal flat area and extends up through the tricycle head tube in the usual way. The handlebars include a tubular post having an exterior flat area extending an appreciable distance along the post. When the two flat areas are aligned, the fork stem slidably receives the handlebar post, with the two flat areas preventing relative rotation of those two members about their common axis.

The handlebars are retained at a selected height above the fork by a collar engaging over the top of the fork stem projecting through the head tube. A set screw inserted into the side of the collar projects through an opening in the fork stem opposite the flat area thereon. When the screw is turned down, it bears against the handlebar post, preventing rotational as well as axial movement of the handlebar relative to the fork.

To limit the rotational motion of the front fork relative to the head tube, a vertical crease is struck in the rear wall of the head tube which forms an internal ridge in the head tube opposite the flat area on the fork post. When the front fork and handle bars are turned to the right or to the left by more that a selected amount, e.g., 45°, further motion in the same direction is stopped by engagement of the ridge by the flat area of the fork post. As a consequence, it is impossible for the steering assembly of the tricycle to lock up or reverse direction. From this it follows that the tricycle is less apt to tip over due to being oversteered when in motion.

It should be emphasized that, as we shall see, the oversteering prevention feature just described is integrated into the steering assembly without sacrificing the torque strength of that assembly.

Furthermore, all of the components of the steering assembly, including the collar, consist of standard, low-cost, stamped and tubular metal parts. The only machining involved is the formation of the threaded opening in the collar to receive a standard machine screw. Accordingly, even though the steering assembly has a selected range of steering motion and exceptionally high rotational torque strength, the overall cost of the tricycle is not increased materially as compared with other prior assemblies not having these advantages. Furthermore, the assembly is easy to install initially and to adjust heightwise later if that becomes necessary.

BRIEF DESCRIPTION OF THE DRAWINGS

For a fuller understanding of the nature and objects of the invention, reference should be had to the following detailed description taken in connection with the accompanying drawings, in which:

FIG. 3 is a fragmentary exploded isometric view of the FIG. 1 assembly.

DETAILED DESCRIPTION OF ILLUSTRATIVE EMBODIMENT

Figures 1, 2:
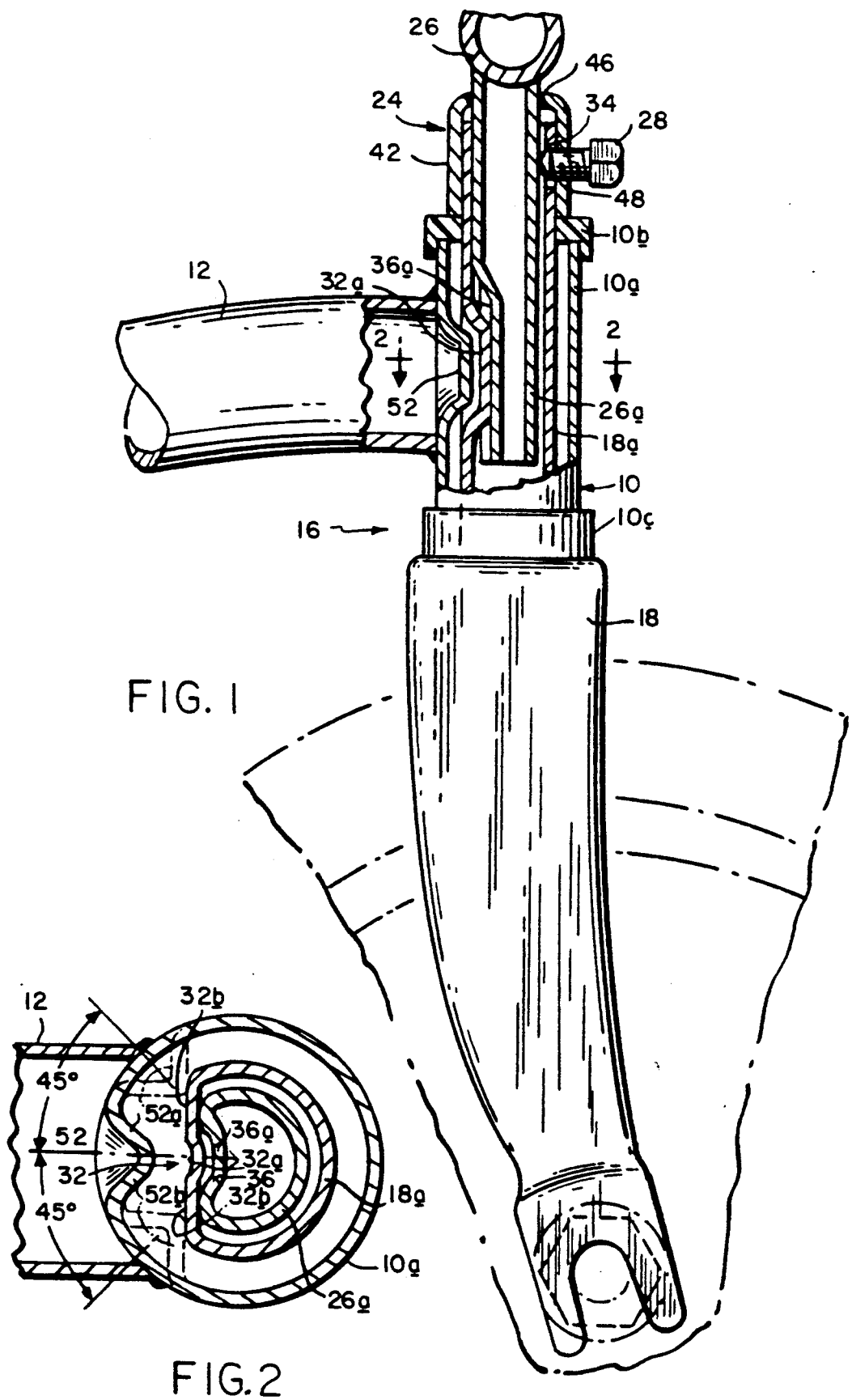
FIG. 1 is a fragmentary elevational view with parts broken away of a tricycle having a steering assembly made in accordance with the present invention.
FIG. 2 is a sectional view taken along line 2—2 of FIG. 1.

Referring now to FIGS. 1 and 3 of the drawings, the steering assembly includes a conventional head tube 10 consisting of a barrel 10a and upper and lower plastic end caps 10b and 10c which provide bearing surfaces. The usual reach bar 12 extends rearwardly from the head tube, being butt-welded thereto. The head tube is arranged to rotatively receive a front wheel assembly shown generally at 16 which includes a front fork 18 having a fork stem 18a extending up through the head tube 10 so that its upper end projects through the top of the tube.

Handlebars 26 have a tubular post 26a which is slidably received in the fork stem 18a. Then, the handlebar post 26a and fork stem 18a are secured together by a machine screw 28 threaded into a collar 24 engaged over the protruding upper end of fork stem 18a and bearing against the handlebar post 26a inside the fork stem 18a, as will be described presently. Prior to installation of the handlebars 26, collar 24 is engaged over the upper end of the fork stem 18a projecting above the head tube.

All of the components of the steering assembly are conventional except for head tube 10, fork stem 18a and the handlebar post 26a. Therefore, only these three members will be dealt with in detail.

Referring now to FIGS. 1 to 3, the fork stem 18a is tubular and has an opening 34 at the front of the stem near the top thereof. Also, it is struck about half way down to form a flat area 32 at the rear of the stem. Actually, it is formed with a vertical crease 32a and a pair of flat areas 32b on opposite sides of crease 32a.

The handlebar post 26a is also struck to form a flat area 36 with a crease 36a at the rear of the post which extends an appreciable distance along the length of the post. The creases 32a and 36a are so positioned on their respective members that when the wheel assembly 16 and handlebar 26 are properly aligned, the creases interfit with one another as shown in FIG. 2.

As best seen in FIGS. 1 and 3, collar 24 comprises a generally cylindrical shell 42. The lower end of shell 42 is fully open and the inside diameter of the shell is slightly larger than the outside diameter of stem 18a so that the collar 24 can be slid over the end of the stem 18a projecting up through head tube 10. The upper end of shell 42 is formed with a reduced diameter opening 46 which is slightly larger in diameter than the outside diameter of the handlebar post 26a, thereby permitting that post to be slid down through opening 46 into stem 18a.

A threaded passage 48 is formed in shell 42 to accommodate the set screw 28. In use, the collar 24 is engaged over the projecting end of the stem 18a and oriented relative thereto so that screw 28 is positioned opposite opening 34 in the stem. Then, the handlebar post 26a is slid down through opening 46 and aligned so that its crease 36a is positioned opposite crease 32a on the fork stem as shown in FIGS. 1 and 2. This alignment permits vertical travel of the handlebar post, yet prevents relative rotation of the post and stem.

When the handlebar 26 is positioned at the correct height above the head tube 10 for the particular child, screw 28 is turned down into the threaded passage 48 until its inner end bears against handlebar post 26a as shown in FIG. 1. Further tightening of the screw tightly presses the flat area 36 on post 26a against the opposing area 32 on stem 18a so that those two members are securely fixed against relative rotational and axial movement.

Even when the wheel assembly 16 is trapped in a relatively deep crack or rut during normal use of the tricycle, the rider can turn the handlebars 26 to escape and the torque will be transmitted to the front fork 18 and wheel without any rotational slippage between the handlebars and the wheel assembly 16.

Referring to FIGS. 1 and 2, in order to limit the rotary excursions of fork 18 and handlebars 26, a vertical crease or groove 52 having a V-shaped cross section is formed in the head tube barrel 10a opposite the flat area 32 on the fork stem 18a and extending toward the head tube axis. The crease is shaped so as to raise a pair of inclined walls 52a and 52b inside head tube 10 which make an angle of about 135° with the diametric plane extending fore and aft through the head tube. Resultantly, when the fork 18 is rotated about its axis about 45° in either direction, a flat area 32b on the stem engages either wall 52a or 52b as shown in phantom in FIG. 2. Such engagement prevents further rotation of the fork stem 18a within the head tube and thus limits to about 45° the extent to which the front wheel of the moving tricycle can be turned relative to the track of the tricycle. When the steering angle is confined by this amount, the tricycle tends not to tip over when in motion.

Preferably, the crease 52 is situated on tube 10 so that it is concealed by the reach bar 12. Also, its walls 52a and 52b are oriented so that when they are engaged by the flat areas 32b of fork stem 18a, the surfaces of those creases and the wall 52a or 52b are parallel so that the contact area is a maximum to minimize the pressure exerted on the contacting parts and thus minimize stress and wear of those parts.

It is important to note that while the flat areas 32b of the fork stem 18a coact with the walls of crease 52 to limit the turning motion of the fork 18, they also cooperate with the handlebar post 26a to prevent relative rotation of the fork and handlebars so that the steering assembly can still pass the torque test required for such tricycles.

Aside from the set screw 28 which is an off-the-shelf item made in high volume and thus at low cost, and the threaded passage 48 in shell 42, the assembly involves no machining of parts. Rather, only conventional stamping and forming techniques are required to make the various components of the assembly. Accordingly, the cost is kept to a minimum. Furthermore, because the steering assembly has only a limited number of discrete parts which must be assembled by the user, the chances of parts becoming lost are minimized. For the same reason, the time and effort required to assemble the components are also kept to a minimum.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. A velocipede steering assembly comprising
a head tube having an axis;
a front fork having a tubular stem rotatably received coaxially in the head tube with its upper end projecting from a top of the head tube;
handlebars having a post slidably received coaxially in the fork stem;

means for securing the handlebar post to the fork stem and for fixing the axial position of the fork stem in the head tube;

means defining an exterior flat area in an exterior wall of the fork stem, and an interior projection extending from an interior wall of the head tube toward the head tube axis which is engaged by said flat area when the fork is turned about said axis by more than a selected amount in either direction so as to limit the angular excursions of said fork about said axis.

2. The assembly defined in claim 1 wherein said projection comprises inclined walls of a vertical V-shaped exterior groove struck in the head tube wall.

3. The assembly defined in claim 2 wherein said angular excursion is 90° or less.

4. The assembly defined in claim 2 wherein said flat area and said inclined walls are oriented so that when said flat area engages either of said inclined walls, the flat area and engaged inclined wall are substantially parallel. X

* * * * *